United States Patent Office 2,864,174
Patented Dec. 16, 1958

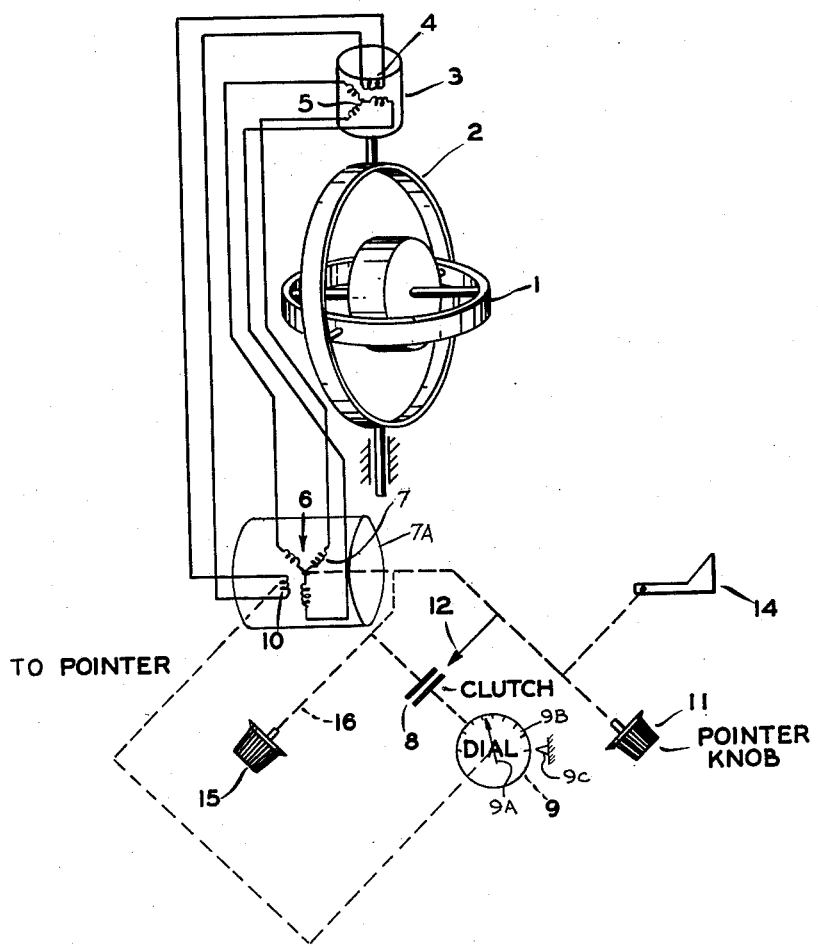

2,864,174

CONTINUOUS INDICATING DIRECTIONAL GYRO INDICATOR

Charles E. Hurlburt, River Edge, and Joseph R. Conway, Bergenfield, N. J., assignors to Bendix Aviation Corporation, Teterboro, N. J., a corporation of Delaware Application December 27, 1955, Serial No. 555,561

8 Claims. (Cl. 33—204)

The present invention pertains to new and useful improvements in gyro directional indicators, such as are conventionally found in aircraft. More particularly, it relates to a directional gyro having a synchro system wherein the actions of the gyro are transmitted to a repeater synchro remote from the gyro, and are read by the movement of a pointer relative to a dial or compass card.

An object of this invention is to provide new and improved means whereby the orientation of the compass card of a directional gyro can be reset without losing any relative directional indication occurring during the resetting operation as a result of changes in aircraft heading.

A further object of the invention is to provide, in a remote reading directional gyro instrument of the transmitter-repeater synchro type, novel and practical means for orienting the pointer relative to the compass card.

The invention further lies in the general organization and arrangement of its various elements, as well as in their cooperative association with one another to effect the results intended.

The foregoing as well as other objects and advantages of this invention will appear more fully hereinafter from a consideration of the detailed description which follows, taken together with the accompanying drawing wherein an embodiment of the invention is illustrated. It is to be expressly understood, however, that the drawing is for purposes of illustration and description and is not to be construed as defining the limits of the invention.

In the single figure of the drawing, a schematic embodiment of the invention illustrated therein discloses a directional gyro having a rotor supported for rotation on a horizontal axis in an inner gimbal 1. The latter is mounted in a supporting frame 2 for rotation on an axis perpendicular to the rotor axis.

The actions of the gyro are picked up by a transmitter synchro arrangement 3 associated with the gyro in conventional manner and having a rotor winding 4 and stator windings 5. The signals of the transmitter are received by a repeater synchro 6 connected to the transmitter in conventional manner. The repeater synchro may be remotely located relative to the gyro transmitter. The repeater synchro has a stator winding 7. The latter is supported by a casing 7A to which is united by a clutch 8 a compass card or reading dial 9 relative to which a pointer 9A is adjustably positioned by a rotor 10, following the actions of the transmitter.

A depressable pointer knob 11, coupled mechanically to a clutch disengaging member 12 and to a signal member 14, when depressed, disengages the compass card from the repeater synchro case and moves the signal member, which may be a flag, into view to indicate a disengaged or inoperative condition of the dial relative to the casing. The pointer knob is further mechanically coupled to the case of the repeater 6, so that, after knob 11 has been depressed, the knob 11 may be rotated to effect rotation of the synchro case 7A. This causes the rotor pointer 9A to follow. Rotation of the synchro case 7A is continued until the pointer is aligned as desired relative to markings 9B on the dial 9. Subsequent withdrawing of the knob serves to reclutch the dial with the synchro case and to remove the signal flag member from view, thus indicating the clutched condition of the dial and synchro case.

A second control knob 15 is mechanically coupled, as indicated by the broken line 16, to the case 7A of the synchro repeater. By this arrangement, the synchro case 7A as clutched to the dial 9 may be rotated by knob 15 as a unit to the extent required to position a selected marking 9B on dial 9 relative to a fixed reference mark 9C outside of the dial. In this action the pointer 9A magnetically follows the movement of the synchro case 7A, maintaining its original reference position relative to the dial.

Should the transmitter send a signal change, as by a change in heading of the craft in which the instrument is mounted, while the foregoing resetting operation is in progress, the signal changes, as made, will be continuously reflected on the presentation, since the operation of the repeater synchro 6 continues uninterrupted.

While an embodiment of the invention has been illustrated and described in detail, it is to be expressly understood that the invention is not limited thereto. Various changes can be made in the design and arrangement of the parts without departing from the spirit and scope of the invention, as the same will now be understood by those skilled in the art; and it is our intent, therefore, to claim the invention not only in the form shown and described, but also in such forms and modifications thereof as may reasonably be construed to be within the spirit of the invention and the scope of the appended claims.

What is claimed is:

1. In combination with a directional gyro including a transmitter synchro carried by the gyro and responsive to angular movements of the gyro gimbal relative to its supporting frame, a repeater synchro including an angularly adjustable case carrying a stator winding and having a rotor responsive angularly to signals of the transmitter received by the said stator winding, a reading dial connected to the case and angularly movable with the case as a unit, a pointer carried for rotation by the rotor relative to the dial, control means for rotating the stator carrying case and dial as a unit, the rotor being continuously responsive to signals received by the stator during operation of the control means, and means for detaching the dial from the stator case, and other control means for angularly adjusting the case free of the dial.

2. In the combination of a craft and a directional gyro, a synchro system including a transmitter synchro responsive to angular movements of the gyro relative to the craft, a repeater synchro responsive to the transmitter, presentation means comprising an angularly adjustable case carrying the stator of the repeater synchro, a reading dial detachably connected to this case, a pointer carried by the rotor of the repeater synchro and rotatable relative to the dial, manually operable control means for detaching the dial from the case, and other means for angularly adjusting the position of the case.

3. In the combination of a directional gyro and a synchro system for repeating the signals of the gyro and translating the repeated signals into readable intelligence, the synchro system comprising: a transmitter synchro connected to the gyro, a remotely located repeater synchro for receiving signals from the transmitter; an angularly adjustable case carrying the stator winding of the repeater synchro, a reading dial, a clutch detachably connecting the reading dial to the case, and a pointer rotatable relative to the dial by the rotor of the repeater synchro.

4. The structure as in claim 3 wherein combined means is provided for first unclutching the dial from the case and subsequently angularly adjusting the case free of the dial.

5. The structure as in claim 3 wherein manually operable mechanical means is provided for first unclutching the dial from the case and subsequently angularly adjusting the case free of the dial.

6. The structure as in claim 3 wherein manually operable mechanical means is provided for adjusting the angular position of the case as clutched to the dial.

7. The structure as in claim 3 wherein a normally hidden warning element is provided for indicating an unclutched condition of the dial from the case and manually operable means is provided for simultaneously effecting an unclutched condition of the dial and bringing into view the warning element.

8. The structure as in claim 3 wherein a normally hidden warning flag is provided for indicating an unclutched condition of the dial, manually operable mechanical means is provided for simultaneously effecting an unclutched condition of the dial and bringing the warning flag into view, and further manually operable mechanical means is provided to subsequently adjust the angular position of the case as unclutched from the dial.

References Cited in the file of this patent

UNITED STATES PATENTS

| | | |
|---|---|---|
| 2,313,682 | Stuart | Mar. 9, 1943 |
| 2,559,094 | Schuck | July 3, 1951 |
| 2,726,457 | Konet et al. | Dec. 13, 1955 |